Patented Jan. 10, 1933

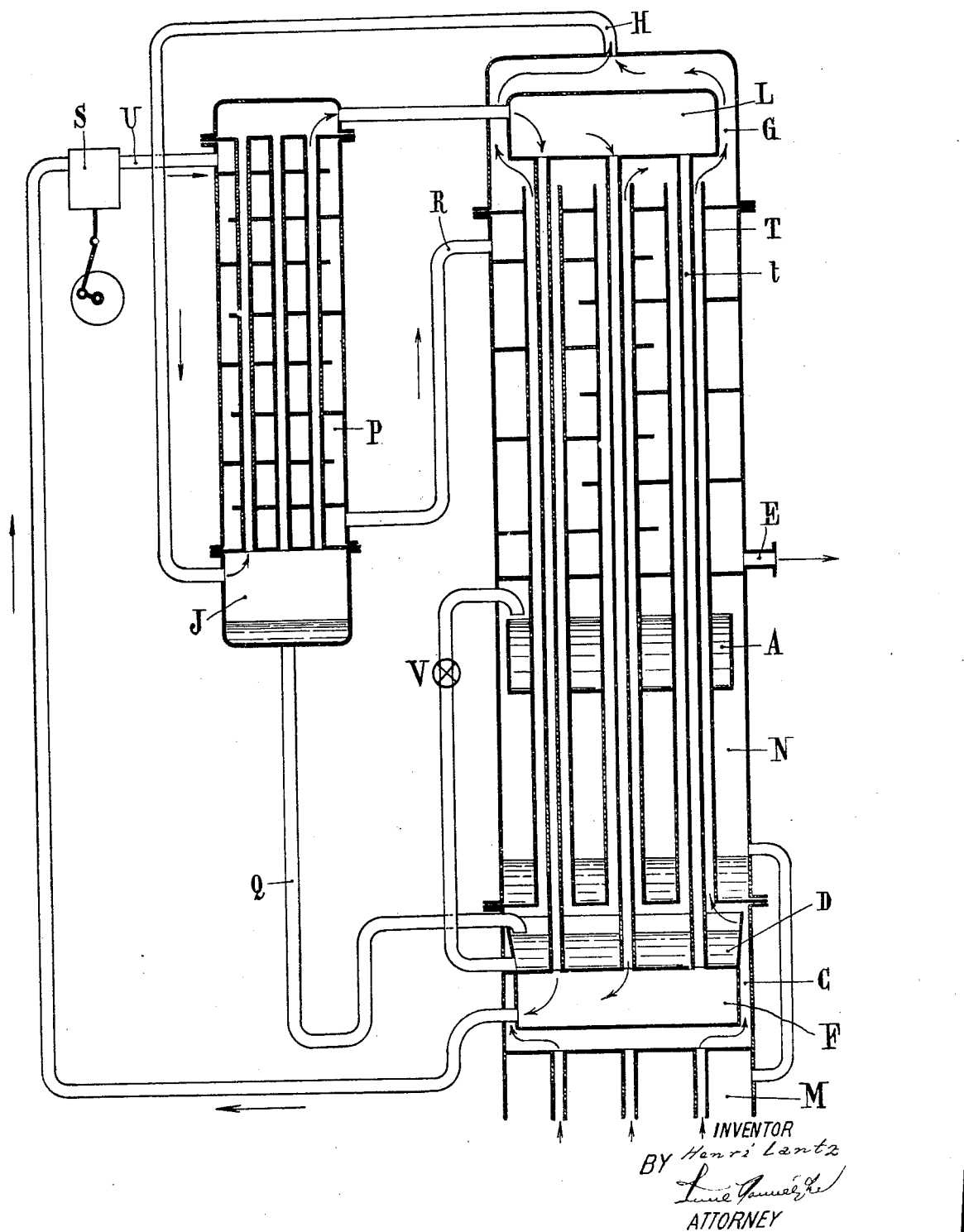

1,894,180

UNITED STATES PATENT OFFICE

HENRI LANTZ, OF PARIS, FRANCE, ASSIGNOR TO L'AIR LIQUIDE, SOCIETE ANONYME POUR L'ETUDE & L'EXPLOITATION DES PROCEDES GEORGES CLAUDE, OF PARIS, FRANCE

SEPARATION OF GASEOUS MIXTURES BY LIQUEFACTION

Application filed December 4, 1929, Serial No. 411,648, and in France December 18, 1928.

This invention relates to an improvement in the separation of the constituents of gaseous mixtures by partial liquefaction. It is especially applicable to the separation of the constituents of hydrogen-containing gaseous mixtures, such as coke-oven or water gas.

It is known, in the separation of the constituents of gaseous mixtures by partial liquefaction under pressure, to expand the non-liquefied gas resulting from the partial liquefaction, thereby obtaining the lowest temperature prevailing in the whole liquefaction apparatus, and to utilize the expanded gas for the final cooling of the gaseous mixture undergoing partial liquefaction.

This invention consists in an improvement of the aforementioned process.

According to this invention, the compressed stripped gas resulting from the partial liquefaction is circulated in indirect contact with the less cold portion of that part of the gaseous mixture undergoing partial liquefaction which is in indirect contact with the expanded gas. In this way, the cooling effect performed by the less cold part of the expanded stripped gas is increased by the cooling effect of the compressed stripped gas.

As the expanded stripped gas, just after its expansion, is somewhat colder than the compressed stripped gas, but, on the other hand, is warmed up during its being used for finally cooling the gaseous mixture, both the compressed and the expanded stripped gases are substantially at the same temperature while cooling the same portion of the incoming mixture. This temperature is but little lower than that of the portion of the gaseous mixture which is being cooled. The cold of both cooling agents is thus utilized at practically the lowest possible temperature, which, as is known, is of advantage.

A preferred embodiment of the process consists in providing for the heat interchange of the coldest part of the gaseous mixture with the expanded gas alone, in a heat interchanger distinct from the remaining liquefaction apparatus. In this way the liquid which separates from the gaseous mixture during its indirect contact with both the expanded and the compressed stripped gases and the liquid which separates during the further indirect contact of the gaseous mixture with the expanded gas alone may be collected separately. A more accurate separation of the liquid condensed from the gaseous mixture and carried along with it is thus provided. At the same time, the liquid condensed from the gaseous mixture during its being finally cooled by the expanded stripped gas alone is not allowed to reach the substantially not so cold part of the gaseous mixture which is cooled both by the compressed and the expanded stripped gases, where it would again partially vaporize, thus again enriching the gaseous mixture in constituents which must be liquefied, which would of course be objectionable.

The process will now be described with reference to the accompanying drawing, which illustrates in vertical section an apparatus adapted for carrying out the invention. In the following the gaseous mixture treated is supposed to be coke-oven gas, but it is understood that the invention is not limited to the treatment of that gas in particular.

On this drawing M is the lower part of the separating column, in which the main condensation that takes place is that of methane and similar gases relatively easily condensable. The ascending gases then pass into the compartment C and thence into the tubes T of the upper part N of the column, in which the condensation of their condensable constituents continues to take place; the condensates produced in the tubes T are collected at D in a liquid state, whence they are discharged through the controlling valve V into the compartment A, from which the liquid flows down round the tubes T.

The condensation in the tubes T is effected in the lower part of the column N with the aid of the cold of the external liquid which flows from the receiver A around the exterior of the tubes T, at the same time partially vaporizing; in the upper part of the column N with the aid of the cold of the expanded hydrogen, which enters through the inlet R and passes out through the outlet E; and, also at the same time, in the entire height of the column N, with the aid of the cold of the compressed hydrogen, which, after having been collected at the top of the heat exchanger P, as will be described below, is sent back from the box L located at the top of the tubes T to the bottom of said tubes, in indirect and methodical contact with the ascending gases, by passage through the interior of the tubes $t$ inserted in the tubes T.

The cold compressed gaseous mixture collected in the chamber G passes into a liquefying exchanger P where it is submitted to a fresh cooling obtained as will be shown presently. The gas rises inside the tubes of P, where it undergoes a final purification by condensation of the impurities which may have escaped the preceding operations; the liquid formed in the tubes of P and the liquid which may have been entrained by the gas in passing out of the tubes T, are collected in the lower receptacle J and carried through the siphon tube Q into the small container D. The gas under pressure thus further cooled reaches the end of the exchanger P, is delivered to the interior of the chamber L situated above the set of tubes T and passes into the inner return tubes $t$ as has been described. The purified gas under pressure escaping from the top of the heat exchanger P is thereby reheated. After being collected in the lower box F, the purified gas passes to the machine S, where it expands, leaving at U and first cooling the liquefying exchanger P and then passing through R it gives up cold in the upper compartment of the apparatus by circulating outside the tubes T; it finally leaves at E.

I claim:

1. A method of separating the constituents of gaseous mixtures by partial liquefaction under pressure and expansion of the compressed stripped gas, which comprises preliminarily cooling and partially liquefying the incoming mixture by circulating it in indirect contact with both the compressed and the expanded gases at the same time, and finally cooling the incoming mixture by circulating it in indirect contact with the expanded stripped gas alone.

2. A method of separating the constituents of gaseous mixtures by partial liquefaction under pressure and expansion of the compressed stripped gas, which comprises preliminarily cooling and partially liquefying the incoming mixture by circulating it in counter-current indirect contact with both the compressed and the expanded stripped gases at the same time, and finally cooling the incoming mixture by circulating it in counter-current indirect contact with the expanded stripped gas alone.

3. A method of separating the constituents of gaseous mixtures by partial liquefaction under pressure and expansion of the compressed stripped gas, which comprises bringing about preliminarily liquefaction of constituents of the incoming mixture by circulating it upwardly in counter-current indirect contact with both the compressed and the expanded stripped gases at the same time and further circulating the incoming mixture in counter-current with the expanded stripped gas alone to cool and effect additional liquefaction of constituents of the mixture.

4. A method of separating the constituents of gaseous mixtures by partial liquefaction under pressure and expansion of the compressed stripped gas, which comprises finally cooling the incoming mixture by circulating it in indirect contact first with both the compressed and the expanded stripped gases at the same time, and further with the expanded stripped gas alone, the part of the incoming mixture which is in indirect contact with both the compressed and the expanded stripped gases being circulated around the compressed gas and within the expanded gas.

5. A method of separating the constituents of gaseous mixtures by partial liquefaction under pressure and expansion of the compressed stripped gas, which comprises preliminarily cooling the incoming mixture by circulating it in indirect contact with both the compressed and the expanded stripped gases at the same time, collecting the liquid condensed from the gaseous mixture during said preliminary cooling, finally cooling the incoming mixture by circulating it in indirect contact with the expanded stripped gas, and collecting the liquid condensed from the gaseous mixture during said final cooling.

6. A method of separating the constituents of gaseous mixtures by partial liquefaction under pressure and expansion of the compressed stripped gas, which comprises finally cooling the incoming mixture by circulating it in indirect contact first with both the compressed and the expanded stripped gases at the same time, and further with the expanded stripped gas alone, the liquid condensed from the incoming mixture during its indirect contact with the expanded stripped gas alone being collected separately from, and further united with, the liquid which separates from the incoming mixture during its indirect contact with both the compressed and the expanded stripped gases at the same time.

7. A method of separating the constituents of gaseous mixtures by partial liquefaction under pressure and expansion of the compressed stripped gas, which comprises relieving the pressure of the liquids resulting from the partial liquefaction, circulating the incoming mixture in indirect contact with both the compressed stripped gases on one hand and said liquids and the gases resulting from the vaporization of same on the other hand at the same time, further circulating the incoming mixture in indirect contact with both the compressed and the expanded stripped gases, and finally circulating the incoming mixture with the expanded stripped gas alone.

8. A method of separating the constituents of gaseous mixtures by partial liquefaction under pressure and expansion of the compressed stripped gas, which comprises circulating the incoming mixture upwardly, in counter-current with and around the compressed stripped gas, further circulating the incoming mixture upwardly in counter-current with both the compressed and the expanded stripped gases at the same time, the compressed stripped gas being circulated within, and the expanded stripped gas around the incoming mixture, collecting the liquid which separates from the incoming mixture during its upward circulation in counter-current with the compressed stripped gas, finally circulating the incoming mixture upwardly, in counter-current with, and within the expanded stripped gas, collecting the liquid which separates from the incoming mixture during said final upward circulation, uniting said liquid with the liquid collected during the upward circulation of the incoming mixture in counter-current with the compressed stripped gas, relieving the pressure of the mixture of both liquids, and circulating said mixture and the gases resulting from the vaporization thereof around that part of the incoming mixture which is circulating in counter-current with the compressed stripped gas but not at the same time in counter-current with the expanded stripped gas.

In testimony whereof I affix my signature.

HENRI LANTZ.